E. RIMAILHO.
GUN CARRIAGE.
APPLICATION FILED JULY 19, 1919.

1,345,246.

Patented June 29, 1920.

Inventor
Emile Rimailho
By [signature]
Attorneys

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

GUN-CARRIAGE.

1,345,246.

Specification of Letters Patent.     Patented June 29, 1920.

Original application filed July 27, 1917, Serial No. 183,199. Divided and this application filed July 19, 1919. Serial No. 312,036.

*To all whom it may concern:*

Be it known that I, EMILE RIMAILHO, a citizen of the French Republic, and residing in Paris, France, 12 Rue de la Rochefoucauld, have invented certain new and useful Improvements in and Relating to Gun-Carriages, of which the following is a complete specification.

This invention relates to a divisional application of my Serial Number 183,199, filed July 27, 1917, now Patent No. 1,332,067 for gun carriage and relates further to a gun-carriage forming a complete artillery unit so constructed as to permit of travel over all sorts of ground, owing to its large bearing surface on the soil, both when traveling and when firing. This plant is particularly valuable on light or wet soils, where the mere support of the usual gun-carriage trails becomes absolutely insufficient. This gun carriage possesses the advantage of being capable of displacement and of pivoting by mechanical control, which permits of any displacement and change of aim necessitated by a change of objective. This gun carriage consists essentially of a chassis, having supports for the trunnions of the cradle of the gun, and provided with rollers which roll over the chains actuated by driving wheels moved by a motor located on the gun carriage itself.

In the accompanying drawing, which illustrates by way of example one constructional form of the invention:

Figure 1:
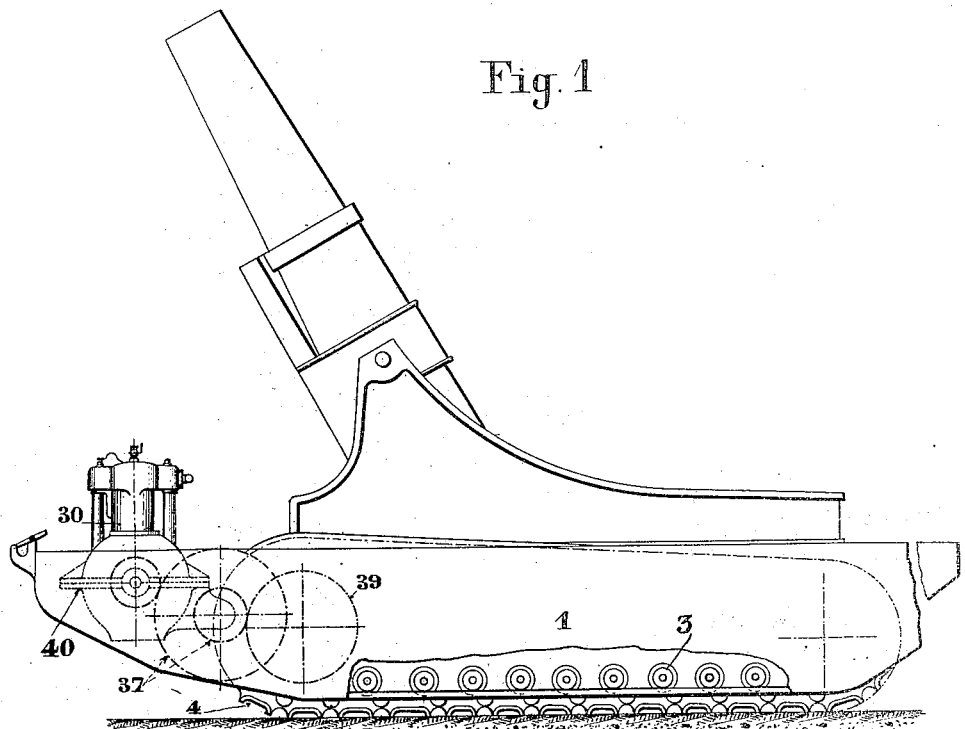
Figure 1 is a side view of a gun carriage forming the subject-matter of the invention.

The gun carriage is formed by two gun-carriage cheek beams 1 connected to one another in front and at the back by cross bars so as to form a trough 7 between the fore part and the rear. These beams are provided with a lateral frame provided at its lower part with rollers 3 rolling on chains 4 of the type actuated by independent driving wheels 5 at the back. Independent chain wheels 6 are arranged at front and serve to keep the chains taut.

The two cheek beams of the gun carriage 1 are united by front and rear floors, the front one of which is divided into two parts by the trough 7, which forms a recoil space for the gun. Upon the rear floor 40 is secured, for instance by the aid of screws not shown, a motor which may be a steam, hydrocarbon or other motor, the transmission of which may control directly the toothed wheels meshing with the chains 4 through the medium of chains, belts or toothed wheels, such transmission being provided with known members such as gear-box, clutch, brake.

In particular, it may be provided with a transmission with toothed wheels, and, in order to facilitate the driving of the carriage, with a clutch of any type for each chain 4, so that the driver may actuate simultaneously both the chains to go forward or backward, or only one of the chains to turn.

In the example of construction shown on the drawing, 30 is the motor, for instance a hydrocarbon motor, the shaft of which bears a pinion 44 meshing with a toothed wheel 45 keyed on a shaft 33 transverse to the carriage, upon the ends of which are secured one part of the clutches 34 and 35. The other parts of the said clutches are mounted on the shafts of the pinions 36 and 37, which mesh with the gear wheels 38 and 39. These wheels 38 and 39 are solid with the gears 5 which actuate the individual chains 4.

Figure 2:
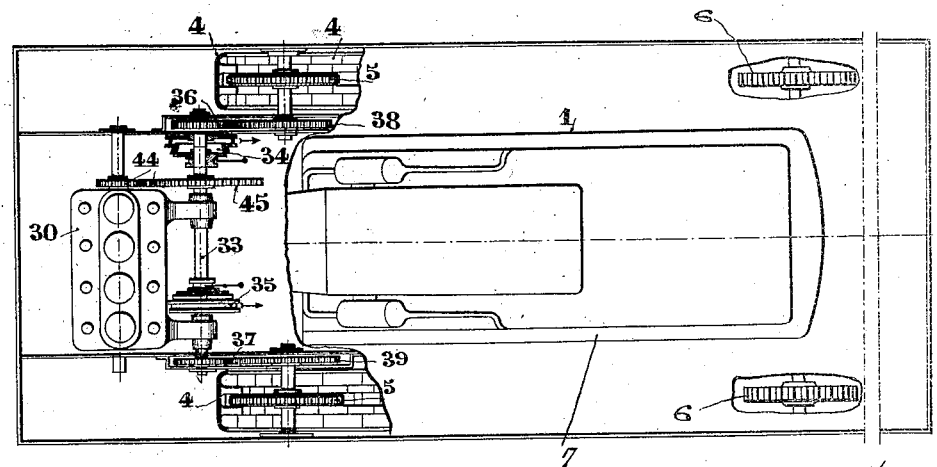
Fig. 2 is a plan, some parts being removed in order to show the mechanical connections between the motor and the chains.

The clutches 34, 35 are controlled by any means such for instance as levers, or chains, provided with a handle placed near the conductor. These clutches are also provided with brakes controlled by the conductor through convenient levers, as shown diagrammatically by the arrows in Fig. 2.

In order to effect a change of objective the gun carriage itself is actuated in such a way as to make it pivot about the rear of one of its chains in order to put it into the new direction.

What I claim is.

1. A gun-carriage, comprising a chassis having a longitudinal central opening forming the recoil space for a gun, front and rear chain wheels carried by the chassis, a chain on each side of the chassis from the rear wheel to the front wheel, rollers carried by the chassis and bearing on the chains, a swinging gun carriage on the chassis, a motor on the gun carriage, and means for controlling the gun carriage and imparting independent motion to the rear chain wheels from the motor.

2. In a gun carriage, a chassis, a chain on each side of the chassis, front and rear chain wheels, a swinging gun carriage mounted on the chassis, a motor, a transverse shaft, gearing between the shaft and motor, shafts carrying pinions and in alinement with the transverse shaft, gear wheels carried by the rear chain wheels and meshing with the said pinions, and clutches, one part of each clutch being on the transverse shaft and the other part on a pinion shaft.

In testimony whereof I have hereunto set my hand at Paris (France), this 30th day of June, 1919.

EMILE RIMAILHO.

In the presence of two witnesses:
CHAS. P. PRESSLEY,
EMILE BERTRAND.